United States Patent
Pan et al.

(10) Patent No.: US 8,353,614 B2
(45) Date of Patent: Jan. 15, 2013

(54) BACKLIGHT UNIT

(75) Inventors: Chih Liang Pan, Hsin-Chu (TW); Shau Yu Tsai, Hsin-Chu (TW); Yen Po Yeh, Hsin-Chu (TW); Yu Hsiu Chang, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 395 days.

(21) Appl. No.: 12/691,535

(22) Filed: Jan. 21, 2010

(65) Prior Publication Data

US 2010/0284202 A1    Nov. 11, 2010

(30) Foreign Application Priority Data

May 8, 2009   (TW) .................. 98115238 A

(51) Int. Cl.
*F21V 7/04* (2006.01)
*G09F 13/04* (2006.01)
(52) U.S. Cl. ........ 362/608; 362/612; 362/621; 362/97.3
(58) Field of Classification Search ............... 362/608, 362/612, 621, 97.2–97.3
See application file for complete search history.

(56) References Cited

U.S. PATENT DOCUMENTS

| 7,011,440 | B2 | 3/2006 | Leu et al. |
| 7,380,969 | B2 * | 6/2008 | Yamashita et al. ............. 362/612 |
| 2008/0278659 | A1 * | 11/2008 | Park .................................. 349/65 |

FOREIGN PATENT DOCUMENTS

| CN | 101320102 A | 12/2008 |
| CN | 101368687 | 2/2009 |
| EP | 2039988 A1 | 3/2009 |
| TW | 558015 | 10/2003 |
| TW | M292707 | 6/2006 |
| TW | M294655 | 7/2006 |
| WO | WO 2008007487 A1 * | 1/2008 |

OTHER PUBLICATIONS

Office Action dated Jul. 6, 2010 for 200910148808.3, which is a corresponding Chinese application, that cites CN101320102A.
English Abstract for 101368687.
English Abstract for M292707.
English Abstract for M294655.
Office Action from corresponding TW application No. 098115238 issued on Sep. 28, 2012 cites US 2008/0278659 A1, TW 558015, EP 2039988 A1.
English abstract of Office Action from corresponding TW application No. 098115238 issued on Sep. 28, 2012.
English abstract of TW 558015.

* cited by examiner

*Primary Examiner* — Diane Lee
*Assistant Examiner* — Sean Gramling
(74) *Attorney, Agent, or Firm* — WPAT, P.C.; Anthony King

(57) ABSTRACT

A backlight unit includes a light guide plate and a plurality of light sources. A side of the light guide plate is provided with an optical microstructure including a plurality of convex lens members aligned along the side. The height-to-pitch ratios of the convex lens members in the central region of the optical microstructure are different from those of the convex lens members in the side regions of the optical microstructure. For example, the height-to-pitch ratios of the convex lens members in the central region of the optical microstructure are larger than the height-to-pitch ratios of the convex lens members in the side regions of the optical microstructure. The light sources may be light emitting diodes (LED) directed toward the optical microstructure.

19 Claims, 8 Drawing Sheets

BACKLIGHT UNIT

BACKGROUND OF THE INVENTION (A) Field of the Invention

The present invention relates to display panel technologies, and more specifically, to a backlight unit.

(B) Description of the Related Art

The recent trend to use light emitting diodes (LEDs) as light sources for notebook computers provides advantages such as thin profile and low power consumption. However, LEDs are a point light source, and create a light pattern that follows a Lambertian distribution. After light enters a light guide plate, according to Snell's law the light will be more concentrated. Therefore, a mixed light region with a certain length is needed to expand the light into a uniform plane light source. For example, the back of the light guide plate may be provided with tiny protrusions, and varying the protrusion distribution can decrease or increase total reflection damage so as to obtain a uniform plane light source.

In consideration of power saving and light weight requirements, the decrease of the number of LEDs serving as light sources and the decrease of the mixed region between the panel and display region have to be achieved concurrently. As a result, the LED hot spot mura problem, which results in interlaced bright-and-dark picture on LED light entry side, cannot be completely resolved by the tiny protrusions on the back of the light guide plate.

A method for improvement is to add a row of microstructures at a side near the LED light entry side, as shown in FIG. 1. The light guide plate 11 is further provided with a microstructure 12 at the light entry side of LEDs 13, and the dashed line area is a picture display area 14. However, the microstructure 12 may have a disadvantage, i.e., the angle between a part of light refracted by the microstructure 12 and the Y-axis may be too large. Because the light guide plate 11 of the backlight unit 10 may be supported by a white frame 15, the light with a large angle after being transmitted through the light guide plate 11 will be emitted from the sides and reflected to the light guide plate 11 by the frame 15. This is called picture light leakage.

Therefore, there is a need to make the display panel thin and simultaneously avoid the problems of LED hot spot mura and side light leakage.

SUMMARY OF THE INVENTION

In order to resolve the above problems, the present invention uses a light source arrangement associated with distribution of optical microstructures at the light entry side of a light guide plate to provide a backlight unit with easy implementation, space saving, high brightness and high quality picture features.

In accordance with an embodiment of the present invention, a backlight unit includes a light guide plate and a plurality of light sources. The light guide plate has a side with an optical microstructure. The optical microstructure includes a plurality of convex lens members, and height-to-pitch ratios of the plurality of convex lens members in a center region of the optical microstructure are different from height-to-pitch ratios of the plurality of convex lens members in side regions of the optical microstructure. The light sources may be LEDs and are directed toward the optical microstructure.

The convex lens members in the center region and the side regions may have various arrangements. For example, the height-to-pitch ratios of the plurality of convex lens members in the center region of the optical microstructure are the same; the height-to-pitch ratios of the plurality of convex lens members in the side regions of the optical microstructure are the same; the height-to-pitch ratios of the plurality of convex lens members in the center region of the optical microstructure are larger than the height-to-pitch ratios of the plurality of convex lens members in the side regions of the optical microstructure.

In another embodiment, the height-to-pitch ratios of the convex lens members in side regions gradually decrease from innermost to outermost positions. The decreasing height-to-pitch ratios can be achieved by gradually decreasing the heights of the convex lens members in the side regions from innermost to outermost positions, or by gradually increasing the pitches in the side regions from innermost to outermost positions.

Moreover, the distribution density of the plurality of the convex lens members in the center region of the optical microstructure is different from distribution density of the plurality of the convex lens members in the side regions of the optical microstructure. For example, the distribution density of the plurality of the convex lens members in the center region of the optical microstructure is larger than the distribution density of the plurality of the convex lens members in the side regions of the optical microstructure.

Preferably, the center region of the plurality of light sources corresponds to the center region of the optical microstructure, and the side regions of the plurality of light sources correspond to the side regions of the optical microstructure. In an embodiment, the distribution density of the plurality of light sources in the center region is less than the distribution density of the plurality of light sources in the side regions, and the intervals of the plurality of light sources in the center region are consistent. Moreover, the intervals of the plurality of light sources in the side regions may gradually decrease from innermost to outermost positions. The plurality of light sources in the side regions may be positioned at gradually increasing distances from the light guide plate, going from innermost to outermost positions.

In accordance with the present invention, the LED hot spot mura and side light leakage problems can be effectively avoided by appropriately arranging the optical microstructure and the light sources.

DETAILED DESCRIPTION OF THE INVENTION

The making and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
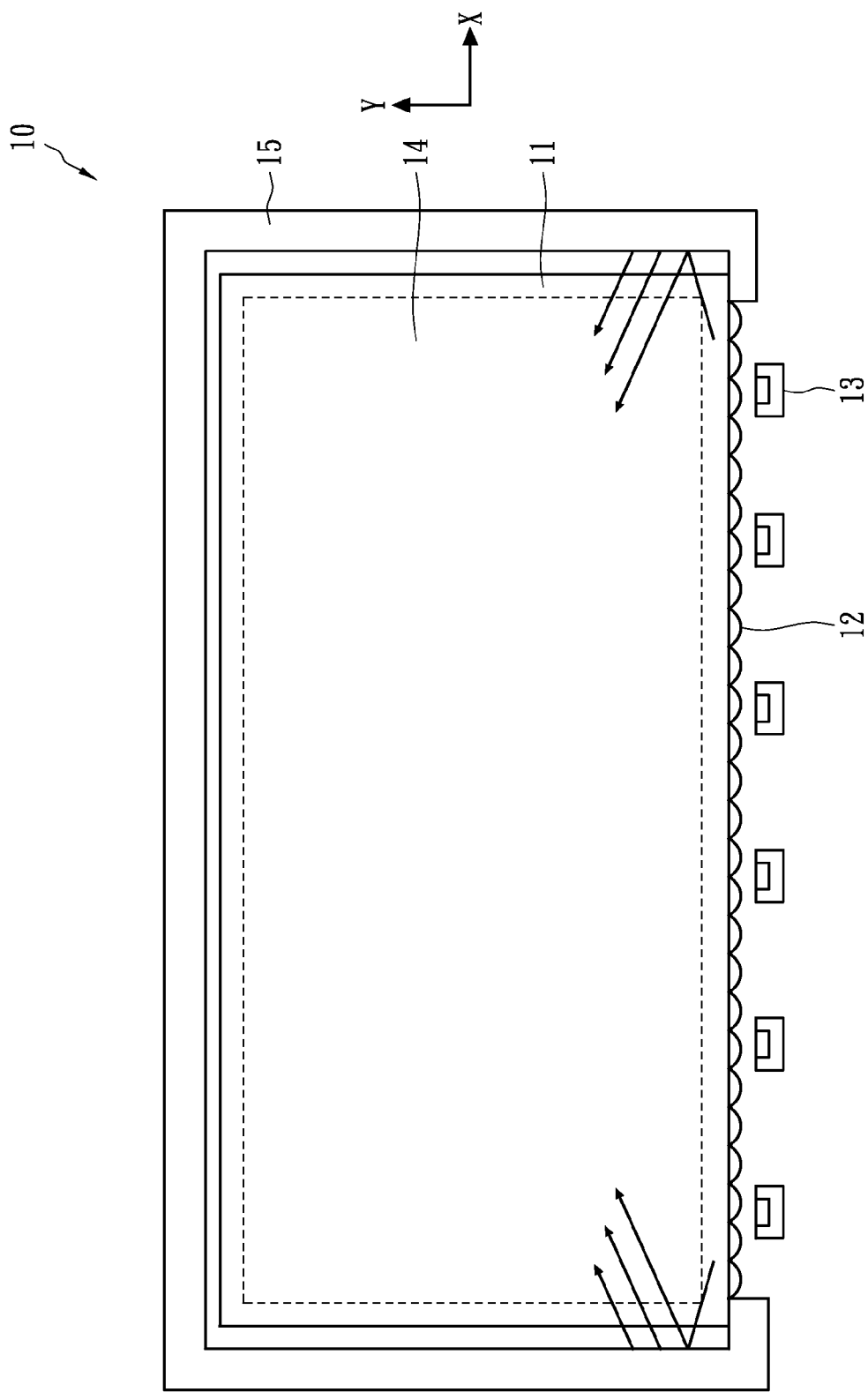
FIG. 1 shows a known backlight unit.
Figure 2A:
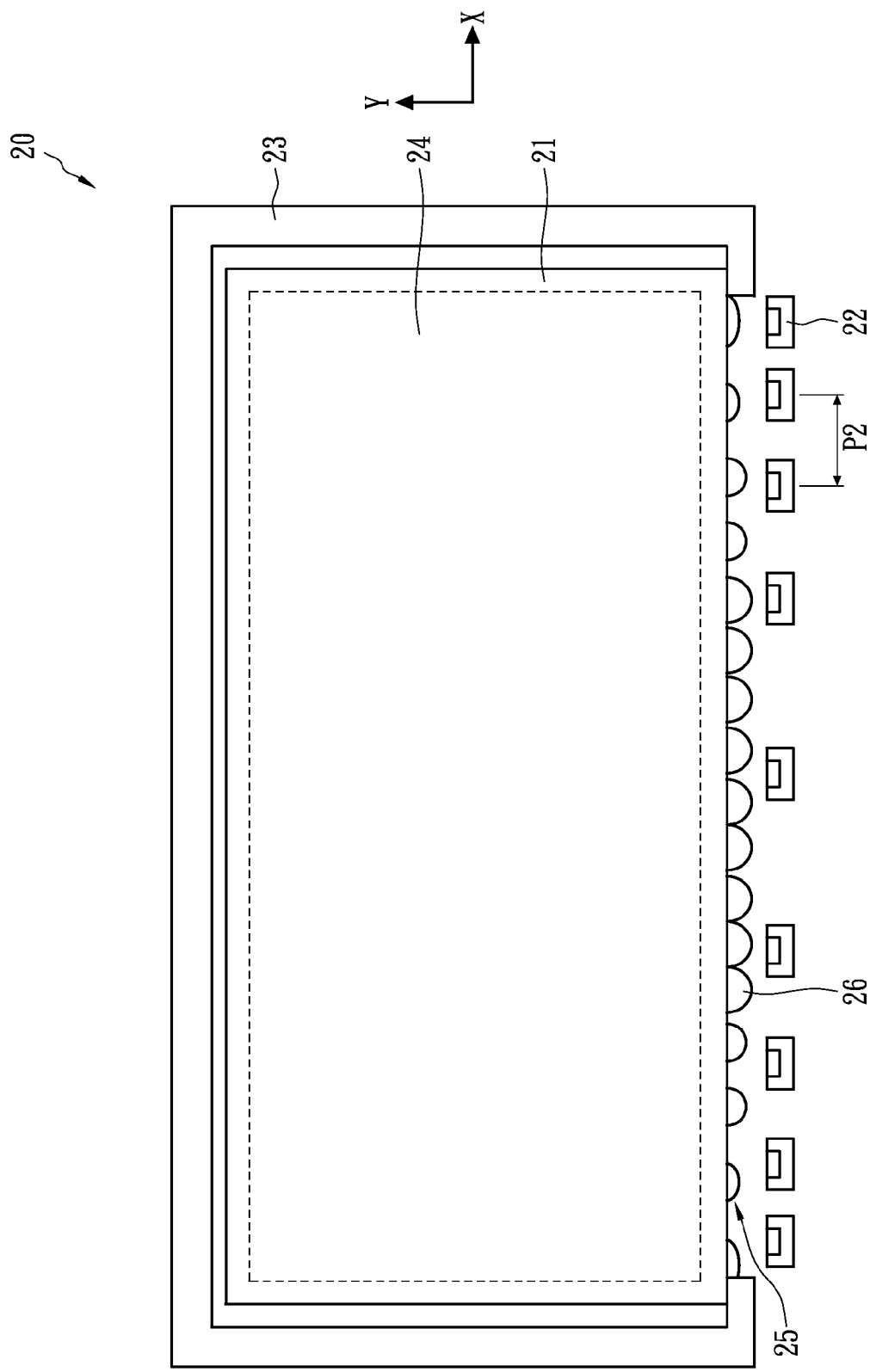
FIGS. 2A, 2B and 3 show the backlight unit in accordance with a first embodiment of the present invention.

FIG. 2A shows a backlight unit in accordance with a first embodiment of the present invention. A backlight unit 20 includes a light guide plate 21, a plurality of light sources 22 and a frame 23. A side of the light guide plate 21 includes an optical microstructure 25 composed of a plurality of convex lens members 26 aligned in a row. The convex lens members 26 have different height-to-pitch ratios in the center region and the side regions of the optical microstructure 25. The dashed line region is the picture display area 24, and the light sources 22 may be LEDs directed toward the light sources 22. In practice, the output light surface of the light guide plate 21 may be provided with various optical films including prisms, diffusion plates and brightness enhancement film of reflective polarized-lens type (not shown).

Figure 3:
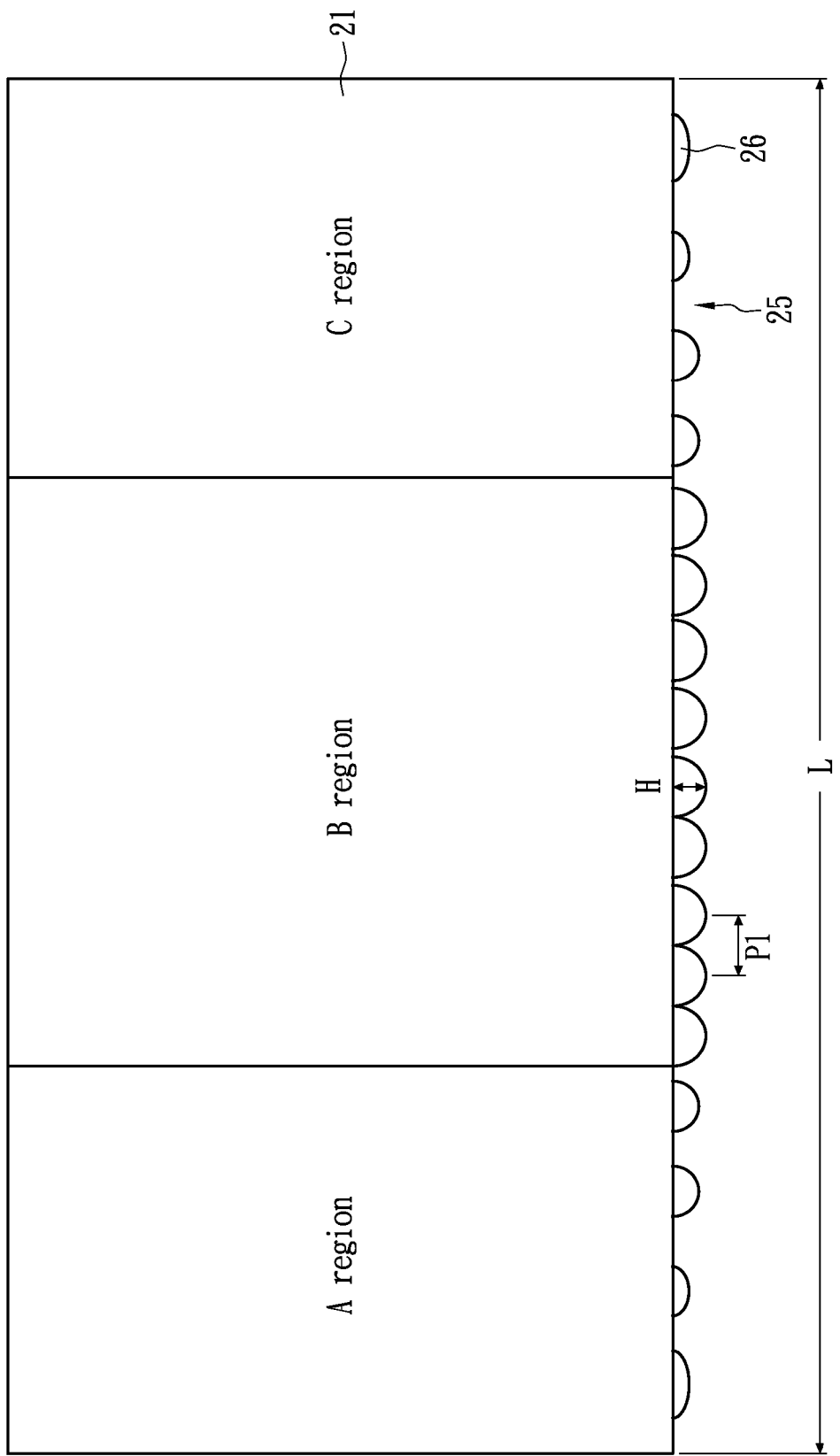

To clearly describe the features of the present invention, the distribution of the optical microstructure 25 of the light guide plate 21 is shown in FIG. 3. The light guide plate 21 can be divided into three regions A, B and C. The left and right sides are the A region and the C region, and the center is the B region. If the length of the optical microstructure 25 is "L," the length of each of A region and C region is less than "L/3," and the length of the center region B is larger than "L/3." In other words, the side regions A and C are placed at two sides of the center region B, and the length of the center region B is larger than any one of the side regions A and C.

Each of the convex lens members 26 is shaped as semi-cylinder or arc cylinder. The interval of adjacent peaks of the convex lens members 26 (i.e., a pitch) is "P1," and the convex lens member 26 protrudes from the side of the light guide plate 21 by a height "H." The H/P1 ratios (height-to-pitch ratios) in B region are larger than the H/P1 ratios in A and C regions. In other words, the shapes of the convex lens members 26 in the center region of the light entry side of the light guide plate 21 are steeper than those in the side regions of the light entry side of the light guide plate 21. In this embodiment, H/P1 ratios in the center region B are the same, and H/P1 ratios in the side region A or C gradually decrease going from innermost to outermost positions of the optical microstructure 25. FIG. 3 shows an example in which H/P1 ratios in regions A and C gradually decrease from innermost to outermost positions. The decreasing H/P1 ratios can be achieved by gradually decreasing the heights "H" of the convex lens members 26 in the side region A or C from innermost to outermost positions, or by gradually increasing the interval or pitch P1 in the side region A or C from innermost to outermost positions. Further, in the side region A or C, H/P1 may be a constant but has to meet the requirement that H/P1 in region B is larger than that in region A or C.

Figure 2B:
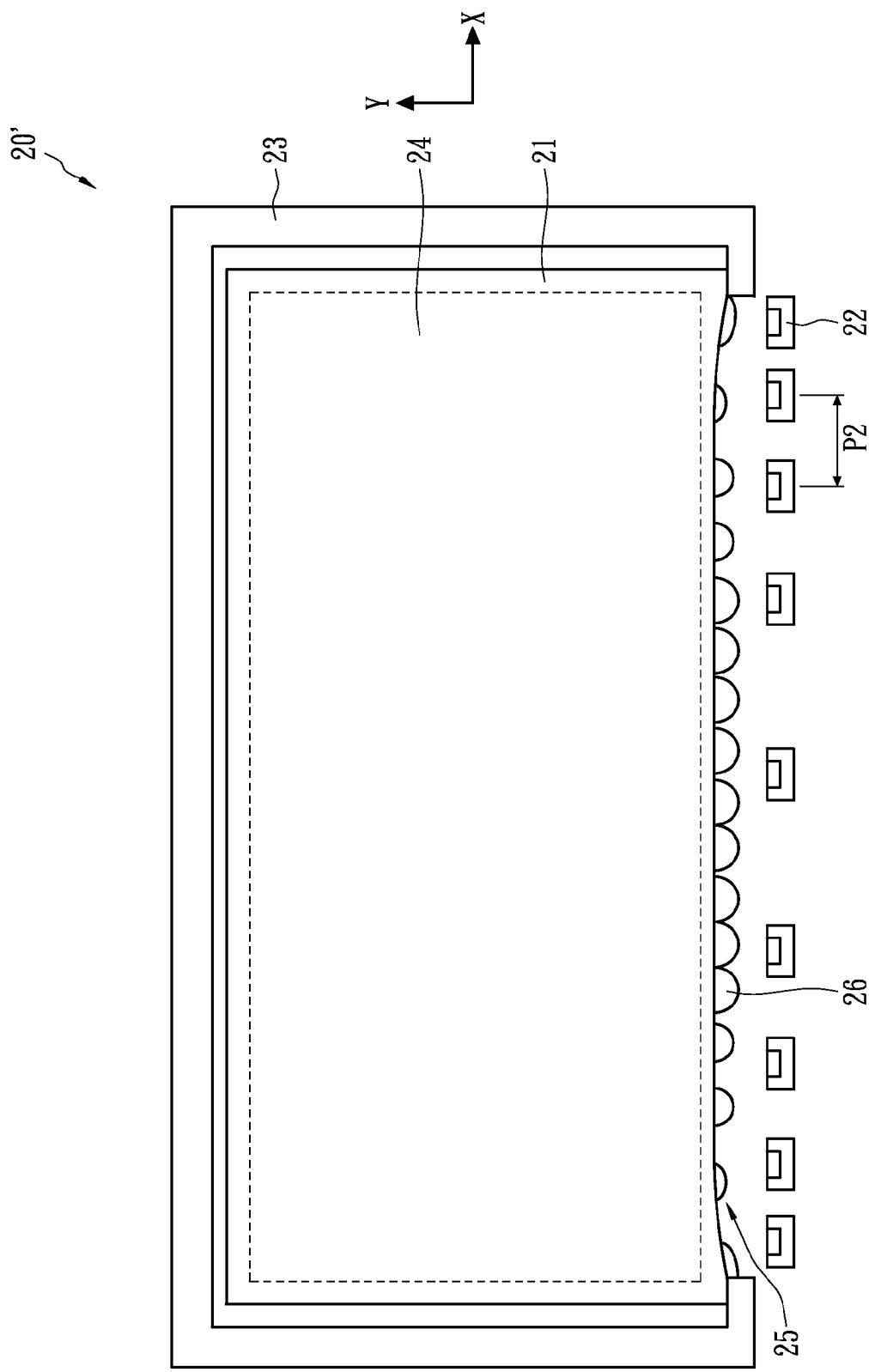

According to the first embodiment, the distribution density of the convex lens members 26 in the center region B of the microstructure 25 is different from those in the side regions A and C of the microstructure 25. For example, the distribution density of the convex lens members 26 in the center region B of the microstructure 25 is larger than that in the side region A or C of the microstructure 25. In other words, the pitches P1 of the convex lens members 26 in the center region B are smaller than those in the side regions A and C. In practice, the side of the light guide plate 21 having the optical microstructure 25 may be slightly concaved inwardly, i.e., it is concaved toward the picture display area 24, so as to form a backlight unit 20' shown in FIG. 2B.

Referring to FIGS. 2A and 3, the center region of the light sources 22 corresponds to the center region (B region) of the optical microstructure 25, and the side regions of the light sources 22 correspond to the side regions (A region and C region) of the optical microstructure 25. In an embodiment, the distribution density of the light sources 22 in the center region is less than that in the side regions, and the intervals P2 of the light sources 22 in the center region are the same. More specifically, P2 of the light sources 22 in the side regions gradually decreases from innermost to outermost positions.

Because H/P1 ratios of the convex lens members 26 in the center region (B region) of the optical microstructure 25 of the light guide plate 21 are large, the optical microstructure 25 can effectively scatter the light of the light sources 22. Accordingly, the number of the light sources 22 can be decreased, so that the intervals P2 between the light sources 22 are larger, and the refracted light having a larger angle with reference to the Y-axis (a normal of the input light surface of the light guide plate 21) is far from the frame 23 at two sides, thereby avoiding side light leakage. On the other hand, the optical microstructure 25 at either side of the light guide plate 21 has the convex lens members 26 with smaller H/P1 ratios, so that the light of the light sources 22 is not scattered effectively. In this case, the intervals P2 of the light sources 22 have to be decreased to resolve the LED hot spot mura problem. Because P2 is small, the angle of the refracted light and Y-axis (a normal of the input light surface of the light guide plate 21) is small. Thus, even if the light is near the frame 23 at two sides, there is no side light leakage.

Figure 4:
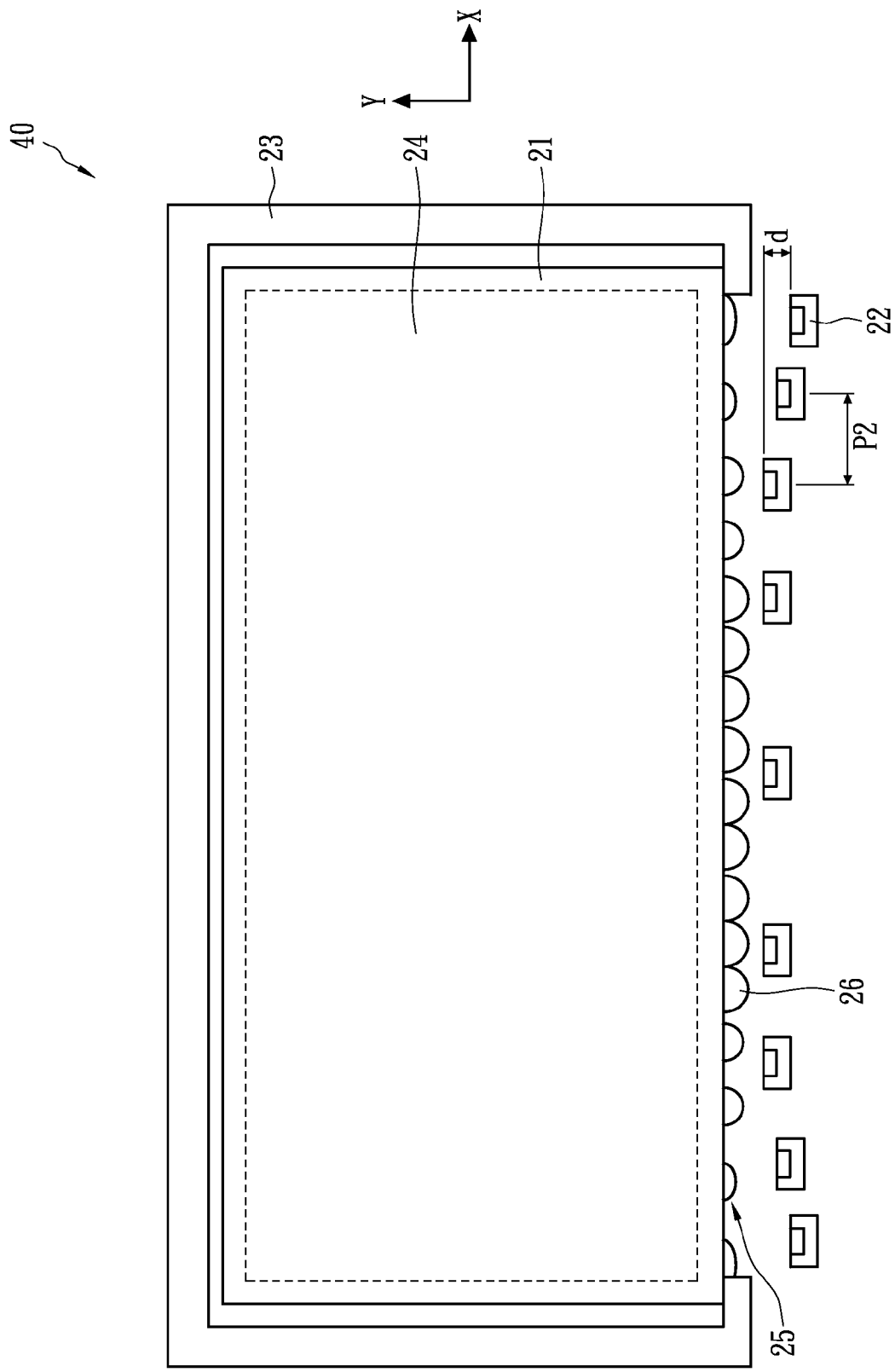
FIG. 4 shows the backlight unit in accordance with a second embodiment of the present invention.

FIG. 4 shows a backlight unit 40 in accordance with a second embodiment of the present invention. In comparison with the first embodiment, the light sources 22 in the side regions (A region or C region) are positioned at gradually increasing distances from the light guide plate 21, going from innermost to outermost positions, and therefore the distances between the light sources 22 and the frame 23 at two sides are increased, so as to avoid side light leakage. In an embodiment, the difference "d" of the distances of the light sources 22 and the light guide plate 21 at an inner end and an outer end of the side region is less than 0.2 mm.

Figure 5A:
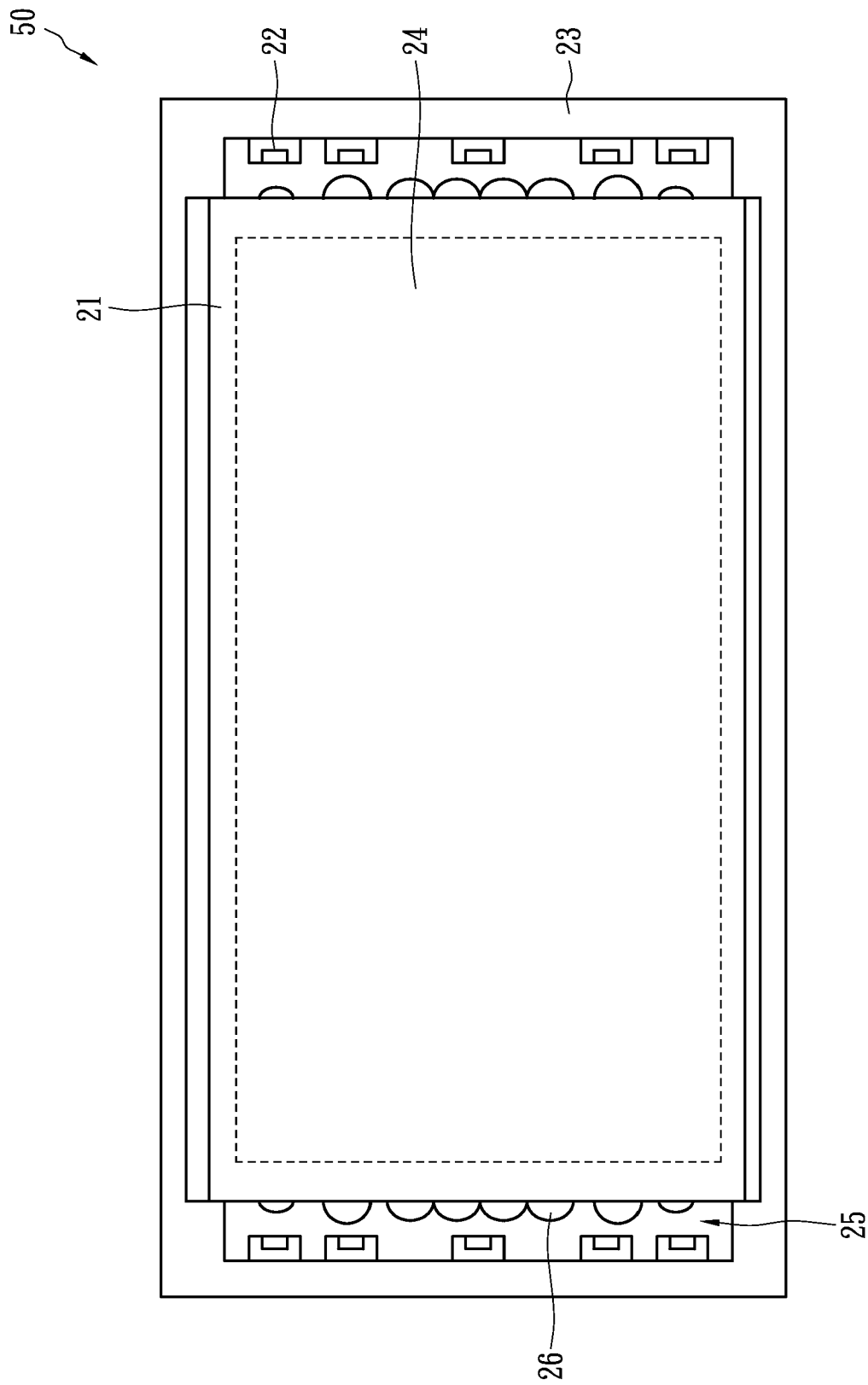
FIGS. 5A and 5B show the backlight unit in accordance with a third embodiment of the present invention.
Figure 5B:
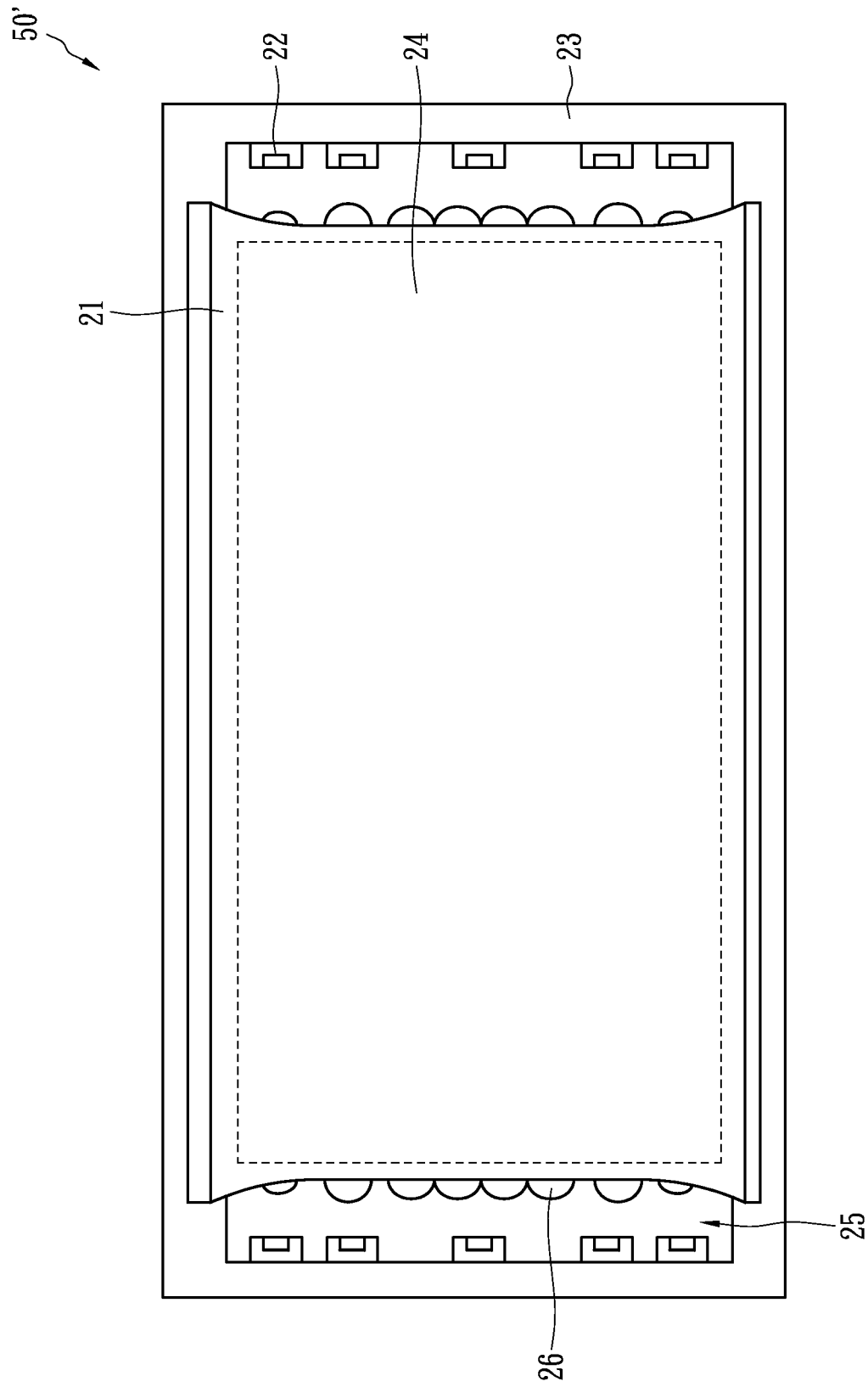

FIG. 5A shows a backlight unit 50 in accordance with a third embodiment. In contrast to the first embodiment, in which the optical microstructure 25 is disposed at a long side of the light guide plate 21, in the third embodiment the optical microstructure 25 is disposed at two short sides of the light guide plate 21. The arrangements of convex lens members 26 of the optical microstructure 25 and the light sources 22 of this embodiment are substantially equivalent to those of the first embodiment. Likewise, this embodiment can also be applied to the optical microstructure 25 having a side concaved inwardly toward the light guide plate 21, so as to form a backlight unit 50' as shown in FIG. 5B.

Figure 6:
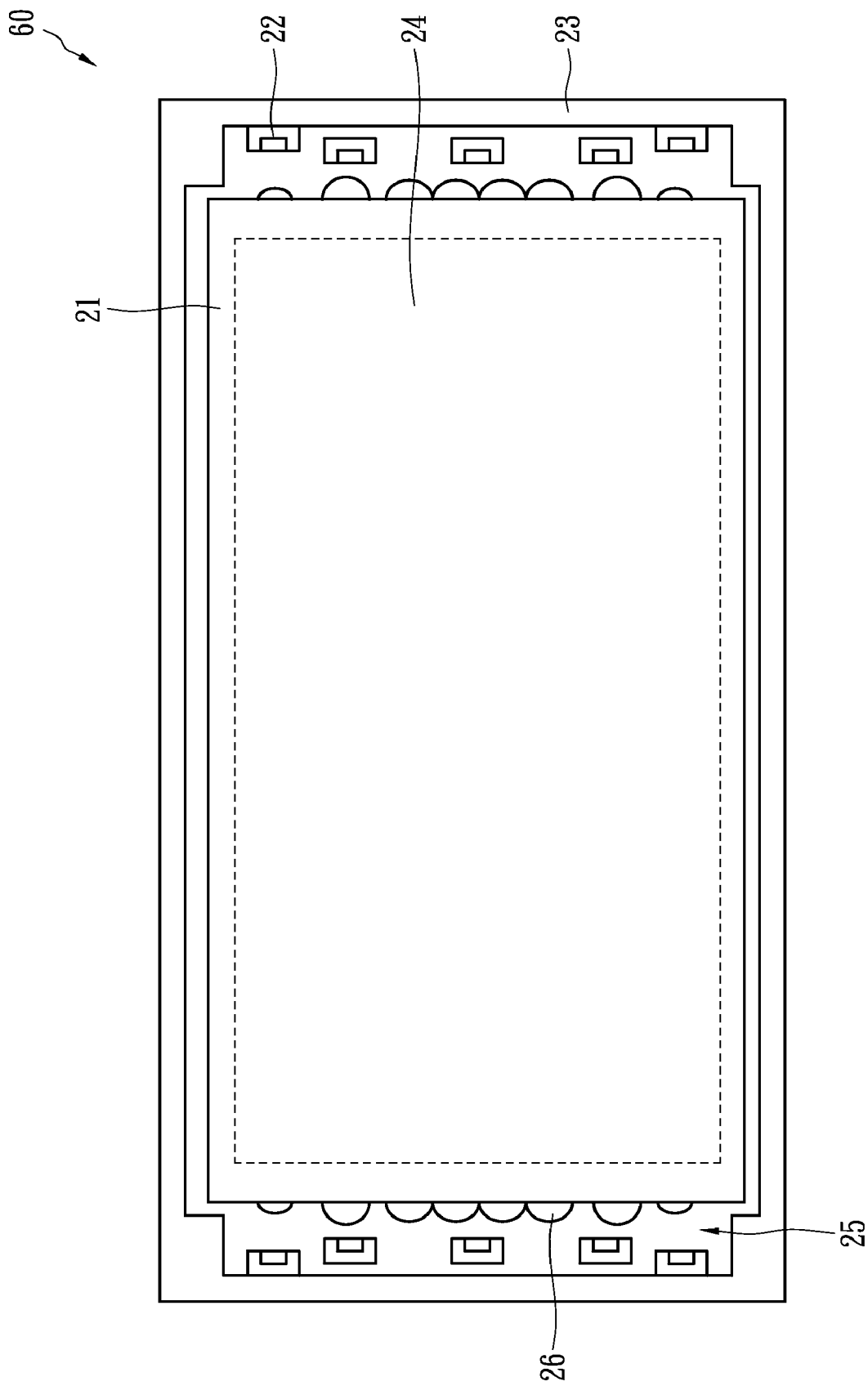
FIG. 6 shows the backlight unit in accordance with a fourth embodiment of the present invention.

FIG. 6 shows a backlight unit 60 in accordance with a fourth embodiment of the present invention. In comparison with the third embodiment, the light sources 22 in the side regions are positioned at gradually increasing distances from the light guide plate 21, going from innermost to outermost positions, and therefore the distances between the light sources 22 and the frame 23 at two sides are increased, so as to avoid side light leakage. In an embodiment, the comparative difference between the light source-light guide plate distance at an inner end and the light source-guide plate distance at an outer end of the side region is less than 0.2 mm. Likewise, this embodiment can also be applied to the optical microstructure 25 having a side concaved inwardly toward the light guide plate 21.

The LED hot spot mura and side light leakage problems can be effectively avoided by appropriately arranging the optical microstructure and the light sources, and such technology is suitable for thin frame applications.

The above-described embodiments of the present invention are intended to be illustrative only. Numerous alternative embodiments may be devised by those skilled in the art without departing from the scope of the following claims.

What is claimed is:

1. A backlight unit, comprising:
a light guide plate having at least one side with an optical microstructure, wherein the optical microstructure comprises a plurality of convex lens members, and height-to-pitch ratios of the plurality of convex lens members in a center region of the optical microstructure are different from height-to-pitch ratios of the plurality of convex lens members in side regions of the optical microstructure; and
a plurality of light sources directed toward the optical microstructure wherein a center region of the plurality of light sources corresponds to the center region of the optical microstructure and side regions of the plurality of light sources correspond to the side regions of the optical microstructure,
wherein intervals of the plurality of light sources in the side regions gradually decrease from innermost to outermost and wherein the plurality of light sources in the side regions are positioned at gradually increasing distances from the light guide plate, going from innermost to outermost positions.

2. The backlight unit of claim 1, wherein the height-to-pitch ratios of the plurality of convex lens members in the center region of the optical microstructure are the same.

3. The backlight unit of claim 1, wherein the height-to-pitch ratios of the plurality of convex lens members in the side regions of the optical microstructure are the same.

4. The backlight unit of claim 1, wherein the height-to-pitch ratios of the plurality of convex lens members in the center region of the optical microstructure are larger than the height-to-pitch ratios of the plurality of convex lens members in the side regions of the optical microstructure.

5. The backlight unit of claim 1, wherein the height-to-pitch ratios of the plurality of convex lens members in the side regions of the optical microstructure gradually decrease from innermost to outermost positions.

6. The backlight unit of claim 5, wherein heights of the plurality of convex lens members in the side regions of the optical microstructure gradually decrease from innermost to outermost positions.

7. The backlight unit of claim 5, wherein pitches of the plurality of convex lens members in the side regions of the optical microstructure gradually increase from innermost to outermost positions.

8. The backlight unit of claim 1, wherein distribution density of the plurality of the convex lens members in the center region of the optical microstructure is different from distribution density of the plurality of the convex lens members in the side regions of the optical microstructure.

9. The backlight unit of claim 8, wherein the distribution density of the plurality of the convex lens members in the center region of the optical microstructure is larger than the distribution density of the plurality of the convex lens members in the side regions of the optical microstructure.

10. The backlight unit of claim 1, wherein the side regions are disposed at two sides of the center region, and the center region is longer than any one of the side regions.

11. The backlight unit of claim 1, wherein the plurality of convex lens members are shaped as semi-cylinder or arc cylinder.

12. The backlight unit of claim 1, wherein the at least one side with the optical microstructure of the light guide plate is concaved inwardly.

13. The backlight unit of claim 1, wherein the optical microstructure is formed at a long side of the light guide plate.

14. The backlight unit of claim 1, wherein the optical microstructure is formed at two short sides of the light guide plate.

15. The backlight unit of claim 1, wherein the plurality of light sources in the center region and the side regions are of different distribution densities.

16. The backlight unit of claim 15, wherein distribution density of the plurality of light sources in the center region is less than distribution density of the plurality of light sources in the side regions.

17. The backlight unit of claim 1, wherein intervals of the plurality of light sources in the center region are consistent.

18. The backlight unit of claim 1, wherein the difference of the distance between the light source and the light guide plate at an inner end of the side region and the distance between the light source and the light guide plate at an outer end of the side region is less than 0.2 mm.

19. The backlight unit of claim 1, wherein the plurality of light sources are light emitting diodes.

* * * * *